US012602853B2

(12) United States Patent
Millardet et al.

(10) Patent No.: US 12,602,853 B2
(45) Date of Patent: Apr. 14, 2026

(54) METHODS AND APPARATUS FOR PET IMAGE RECONSTRUCTION USING MULTI-VIEW HISTO-IMAGES OF ATTENUATION CORRECTION FACTORS

(71) Applicants: Siemens Medical Solutions USA, Inc., Malvern, PA (US); The Trustees of The University of Pennsylvania, Philadelphia, PA (US)

(72) Inventors: Mael Millardet, Knoxville, TN (US); Samuel Matej, Springfield, PA (US); Deepak Bharkhada, Knoxville, TN (US); Vladimir Panin, Knoxville, TN (US); Joshua Schaefferkoetter, Knoxville, TN (US)

(73) Assignees: Siemens Medical Solutions USA, Inc., Malvern, PA (US); The Trustees of The University of Pennsylvania, Philadelphia, PA (US)

( * ) Notice: Subject to any disclaimer, the term of this patent is extended or adjusted under 35 U.S.C. 154(b) by 273 days.

(21) Appl. No.: 18/502,347

(22) Filed: Nov. 6, 2023

(65) Prior Publication Data

US 2025/0148663 A1     May 8, 2025

(51) Int. Cl.
*G06T 12/20* (2026.01)

(52) U.S. Cl.
CPC .......... *G06T 12/20* (2026.01); *G06T 2210/41* (2013.01); *G06T 2211/441* (2023.08)

(58) Field of Classification Search
CPC ............... G06T 11/006; G06T 2210/41; G06T 2211/441
See application file for complete search history.

(56) References Cited

U.S. PATENT DOCUMENTS

| | | | |
|---|---|---|---|
| 11,164,344 B2 | 11/2021 | Whiteley et al. | |
| 2014/0029830 A1* | 1/2014 | Vija | G06T 5/50 382/128 |
| 2021/0104079 A1* | 4/2021 | Whiteley | G06N 3/084 |

* cited by examiner

*Primary Examiner* — Jianxun Yang

(57) ABSTRACT

Systems and methods for reconstructing medical images based on the trained deep learning processes, and for training deep learning processes, are disclosed. In some examples, image measurement data is received. A histo-image is generated based on the image measurement data. Further, an attenuation map, such as a µ-map, is received. An attenuation histo-image is generated based on the attenuation map. Further, a trained machine learning process, such as a trained neural network, is applied to features generated from the histo-image and the attenuation histo-image. Based on the application of the machine learning process to the histo-image and the attenuation histo-image, output image data characterizing an image volume is generated. In some examples, a machine learning process is trained based on histo-images and corresponding attenuation histo-images. The trained machine learning process may be employed to reconstruct images, such as positron emission tomography (PET) images.

18 Claims, 10 Drawing Sheets

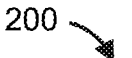
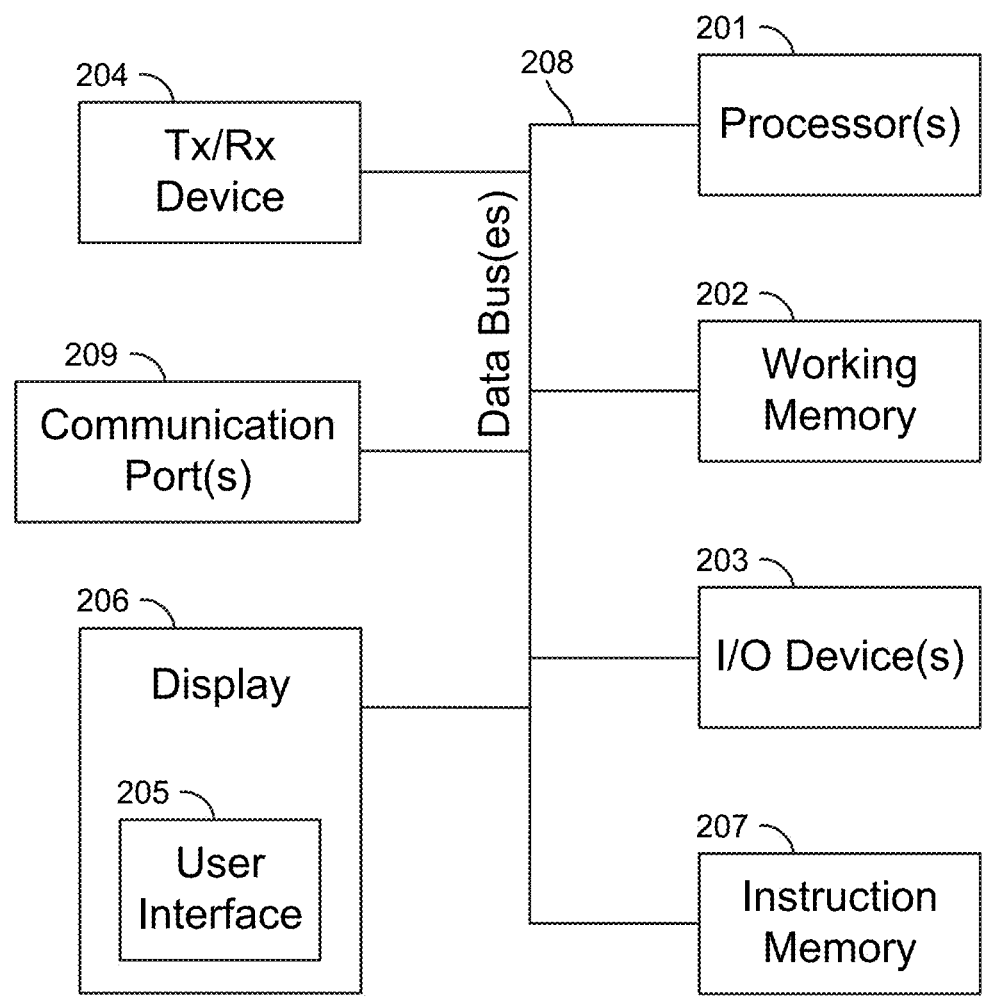
FIG. 2

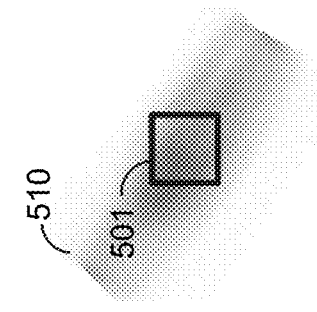
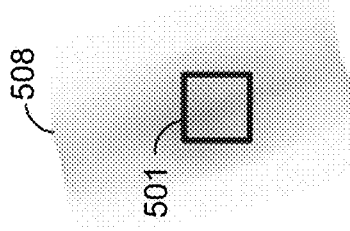
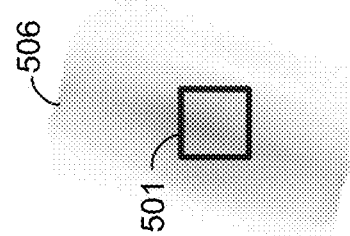
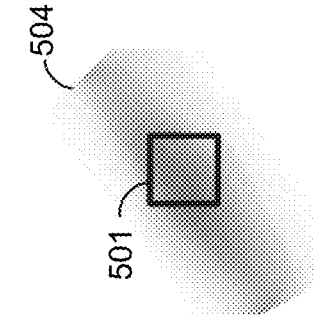
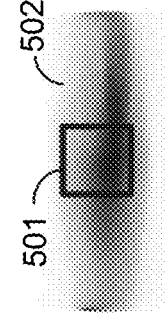
FIG. 5

(a) Brain, MLEM (b) Brain, DL-ACF (c) Brain, DL-$\mu$-map (d) Liver, MLEM (e) Liver, DL-ACF (f) Liver, DL-$\mu$-map

| Mean activity (a.u.) | Validation patient 1 | | Validation patient 2 | |
| --- | --- | --- | --- | --- |
| | Grey matter | Cerebellum | Liver | Myocardium |
| MLEM | 2.8 | 3.3 | 2.0 | 7.5 |
| DL-ACF | 2.5 | 3.1 | 1.9 | 9.0 |
| DL-$\mu$-map | 3.9 | 4.9 | 1.8 | 6.3 |

FIG. 6B

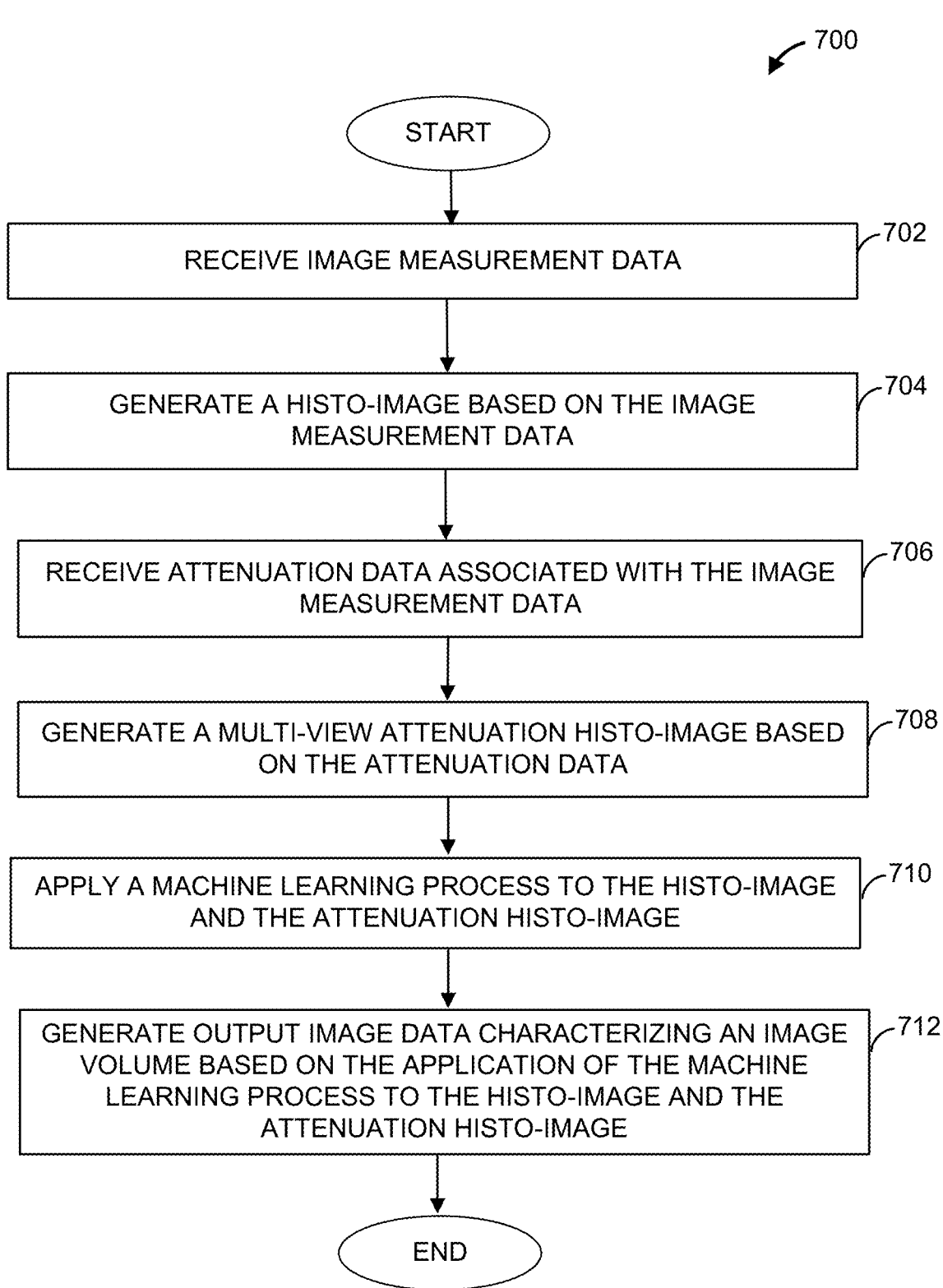

700

START

702
RECEIVE IMAGE MEASUREMENT DATA

704
GENERATE A HISTO-IMAGE BASED ON THE IMAGE MEASUREMENT DATA

706
RECEIVE ATTENUATION DATA ASSOCIATED WITH THE IMAGE MEASUREMENT DATA

708
GENERATE A MULTI-VIEW ATTENUATION HISTO-IMAGE BASED ON THE ATTENUATION DATA

710
APPLY A MACHINE LEARNING PROCESS TO THE HISTO-IMAGE AND THE ATTENUATION HISTO-IMAGE

712
GENERATE OUTPUT IMAGE DATA CHARACTERIZING AN IMAGE VOLUME BASED ON THE APPLICATION OF THE MACHINE LEARNING PROCESS TO THE HISTO-IMAGE AND THE ATTENUATION HISTO-IMAGE

END

FIG. 7

METHODS AND APPARATUS FOR PET IMAGE RECONSTRUCTION USING MULTI-VIEW HISTO-IMAGES OF ATTENUATION CORRECTION FACTORS

This invention was made with government support under EB031806 awarded by the National Institutes of Health. The government has certain rights in the invention.

FIELD

Aspects of the present disclosure relate in general to medical diagnostic systems and, more particularly, to reconstructing images from nuclear imaging systems for diagnostic and reporting purposes.

BACKGROUND

Nuclear imaging systems can employ various technologies to capture images. For example, some nuclear imaging systems employ positron emission tomography (PET) to capture images. PET is a nuclear medicine imaging technique that produces tomographic images representing the distribution of positron emitting isotopes within a body. Some nuclear imaging systems employ computed tomography (CT), for example, as a co-modality. CT is an imaging technique that uses x-rays to produce anatomical images. Magnetic Resonance Imaging (MRI) is an imaging technique that uses magnetic fields and radio waves to generate anatomical and functional images, and may also be used as a co-modality. Some nuclear imaging systems combine images from PET and CT scanners during an image fusion process to produce images that show information from both a PET scan and a CT scan (e.g., PET/CT systems). Similarly, some nuclear imaging systems combine images from PET and MRI scanners to produce images that show information from both a PET scan and an MRI scan.

Typically, these nuclear imaging systems generate PET measurement data based on captured PET scans, and process the PET measurement data using mathematical algorithms to reconstruct medical images. For example, PET image reconstruction can be based on machine learning models that reconstruct a PET image based on received PET measurement data. In some more recent examples, histo-images are generated based on the PET measurement data, and the histo-images are provided to a machine learning model to reconstruct a PET image. To correct for photon attenuation when reconstructing PET images, the nuclear imaging systems often rely on attenuation maps that are generated based on co-modality scans (e.g., CT scans or MRI scans). For instance, the nuclear imaging systems may provide PET measurement data and a patch (e.g., portion) of a corresponding attenuation map to a machine learning model to reconstruct a PET image. These image reconstruction processes, however, can include algorithmic biases that lead to errors (e.g., hallucinations) within reconstructed images. As such, there are opportunities to address these and other deficiencies in nuclear imaging systems.

SUMMARY

Systems and methods for training deep learning processes, and for reconstructing medical images based on the trained deep learning processes, are disclosed.

In some embodiments, a computer-implemented method includes receiving image measurement data. The method also includes generating a histo-image based on the image measurement data. Further, the method includes receiving attenuation data associated with the image measurement data. The method also includes generating an attenuation histo-image based on the attenuation data. The method further includes applying a machine learning process to the histo-image and the attenuation histo-image and, based on the application of the machine learning process to the histo-image and the attenuation histo-image, generating output image data characterizing an image volume.

In some embodiments, a non-transitory computer readable medium stores instructions that, when executed by at least one processor, cause the at least one processor to perform operations including receiving image measurement data. The operations also include generating a histo-image based on the image measurement data. Further, the operations include receiving attenuation data associated with the image measurement data. The operations also include generating an attenuation histo-image based on the attenuation data. The operations further include applying a machine learning process to the histo-image and the attenuation histo-image and, based on the application of the machine learning process to the histo-image and the attenuation histo-image, generating output image data characterizing an image volume.

In some embodiments, a system includes a data repository and at least one processor communicatively coupled the data repository. The at least one processor is configured to receive image measurement data. The at least one processor is also configured to generate a histo-image based on the image measurement data. Further, the at least one processor is configured to receive attenuation data associated with the image measurement data. The at least one processor is also configured to generate an attenuation histo-image based on the attenuation data. The at least one processor is further configured to apply a machine learning process to the histo-image and the attenuation histo-image and, based on the application of the machine learning process to the histo-image and the attenuation histo-image, generate output image data characterizing an image volume.

In some embodiments, a computer-implemented method includes receiving histo-images and corresponding attenuation histo-images. The method also includes generating features based on the histo-images and the corresponding attenuation histo-images. Further, the method includes inputting the features to a neural network. The method also include receiving output image data from the neural network. The method further includes determining a loss value based on the output image data. The method also includes determining the neural network is trained based on the loss value. Further, the method includes storing parameters associated with the neural network in a data repository.

In some embodiments, a non-transitory computer readable medium stores instructions that, when executed by at least one processor, cause the at least one processor to perform operations including receiving histo-images and corresponding attenuation histo-images. The operations also include generating features based on the histo-images and the corresponding attenuation histo-images. Further, the operations include inputting the features to a neural network. The operations also include receiving output image data from the neural network. The operations further include determining a loss value based on the output image data. The operations also include determining the neural network is trained based on the loss value. Further, the operations include storing parameters associated with the neural network in a data repository.

In some embodiments, a system includes a data repository and at least one processor communicatively coupled the data repository. The at least one processor is configured to receive histo-images and corresponding attenuation histo-images. The at least one processor is also configured to generate features based on the histo-images and the corresponding attenuation histo-images. Further, the at least one processor is configured to input the features to a neural network. The at least one processor is also configured to receive output image data from the neural network. The at least one processor is further configured to determine a loss value based on the output image data. The at least one processor is also configured to determine the neural network is trained based on the loss value. Further, the at least one processor is configured to store parameters associated with the neural network in a data repository.

BRIEF DESCRIPTION OF THE DRAWINGS

The following will be apparent from elements of the figures, which are provided for illustrative purposes and are not necessarily drawn to scale.

FIG. 2 illustrates a block diagram of an example computing device that can perform one or more of the functions described herein, in accordance with some embodiments.

FIG. 5 illustrates various views of attenuation histo-images, in accordance with some embodiments.

FIG. 6B is a table illustrating detected activity for the reconstructed images of FIG. 6A.

FIG. 7 is a flowchart of an example method to reconstruct an image, in accordance with some embodiments.

DETAILED DESCRIPTION

Figure 1:
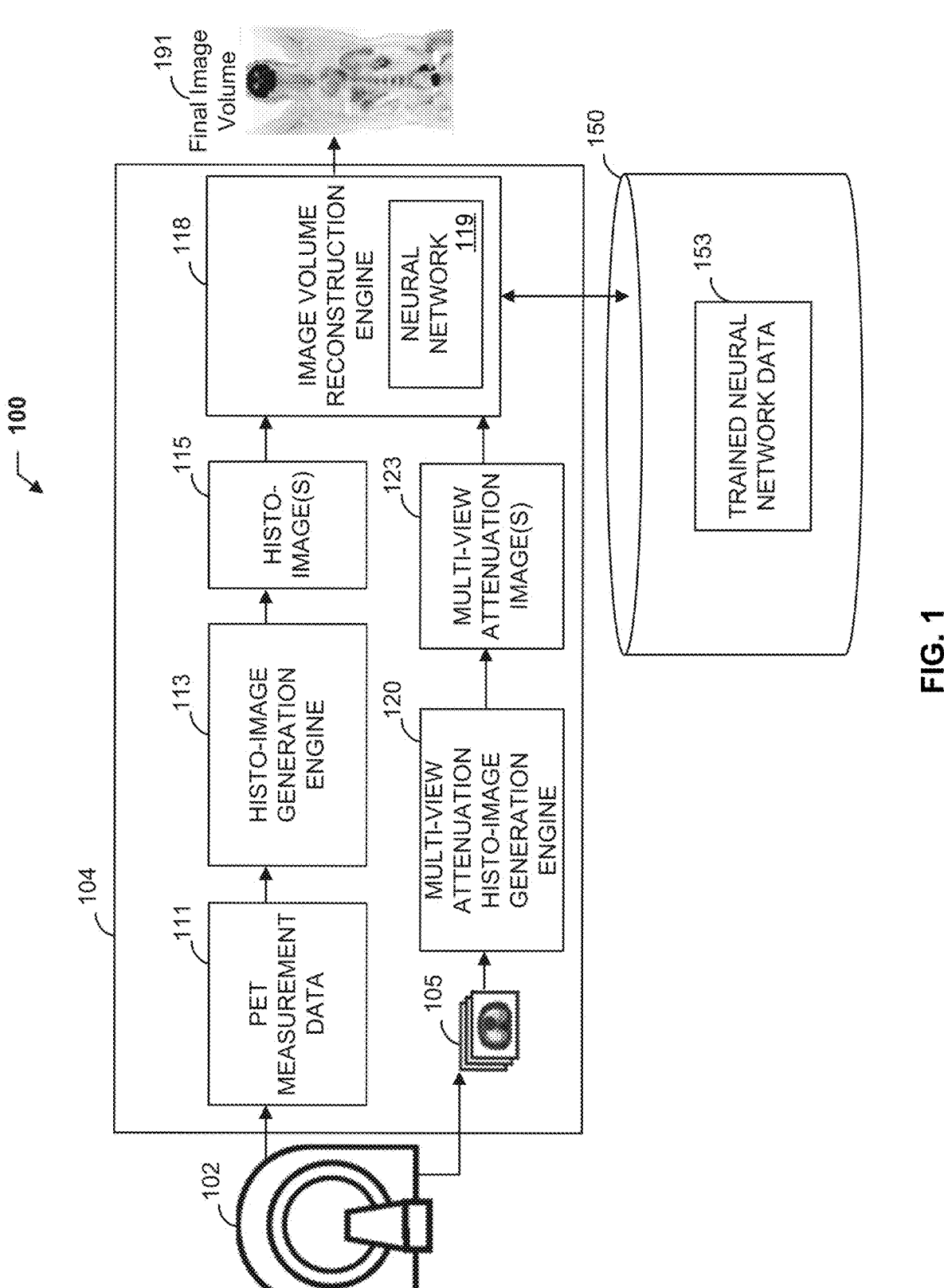
FIG. 1 illustrates a nuclear imaging system, in accordance with some embodiments.

This description of the exemplary embodiments is intended to be read in connection with the accompanying drawings, which are to be considered part of the entire written description. Independent of the grammatical term usage, individuals with male, female, or other gender identities are included within the term.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system. Similarly, claims for methods and systems for training image reconstruction functions can be improved with features described or claimed in context of the methods and systems for image reconstruction, and vice versa.

Various embodiments of the present disclosure can employ machine learning methods or processes to provide clinical information from nuclear imaging systems. For example, the embodiments can employ machine learning methods or processes to reconstruct images based on captured measurement data, and provide the reconstructed images for clinical diagnosis. In some embodiments, machine learning methods or processes are trained, to improve the reconstruction of images.

End-to-end deep learning image reconstruction has gained interest in recent years. Typically, a sinogram and a corresponding patch of an attenuation map (e.g., $\mu$-map) from a co-modality are provided as separate channels to a machine learning model to reconstruct a PET image. More recently, sinograms have been replaced with histo-images. In other words, a histo-image and a corresponding patch of the attenuation map from the co-modality are provided as separate channels to the machine learning model to reconstruct the PET image. However, these methods produce inconsistent bias in the reconstructed images. At least some of the inconsistent bias is due to a lack of attenuation information provided to the machine learning model. For example, when using patch-based inputs to the machine learning models, each patch of the attenuation map fails to provide attenuation information outside a particular patch.

To address these and other deficiencies, in at least some embodiments, rather than providing a conventional attenuation map to the machine learning model, a multi-view attenuation histo-image is generated. Each multi-view attenuation histo-image contains attenuation correction factors (ACF) in a same geometry as the image data. As a result, the attenuation of each voxel along entire lines of response are provided in a view corresponding to the image data. The multi-view attenuation histo-images and corresponding histo-image may have a same number of views (e.g., ten views). Further, the multi-view attenuation histo-images and corresponding histo-image may be provided as inputs to a machine learning model, such as a neural network. For instance, the multi-view attenuation histo-images may be provided within one or more input channels (e.g., ten input channels), and the histo-image is provided as a separate input channel. Based on the inputted data, the machine learning model generates output data characterizing a reconstructed image, such as a reconstructed PET image. The reconstructed PET image may provide significant improvement in image quantification, among other advantages.

In some embodiments, a machine learning model (e.g., machine learning algorithm), such as a neural network, is trained based on histo-images and corresponding multi-view attenuation histo-images. For instance, features may be generated based on the histo-images and corresponding multi-view attenuation histo-images, and the generated features may be input to into the machine learning model. Based on the inputted features, the machine learning model may generate output image data. For example, based on the inputted features, one or more input values and one or more output values may be computed for each of multiple layers of the machine learning model, and the output image data may characterize the final output of the machine learning model, which may be a reconstructed image (e.g., a reconstructed PET image).

FIG. 1 illustrates a nuclear imaging system 100 that includes image scanning system 102 and image reconstruction system 104. Image scanning system 102 may be PET scanner that can capture PET images, a PET/MR scanner that can capture PET and MR images, a PET/CT scanner that can capture PET and CT images, or any other suitable image scanner. For example, as illustrated, image scanning system 102 can capture PET images (e.g., of a person), and can generate PET measurement data 111 (e.g., PET raw data, such as sinogram data, list-mode data) based on the captured PET images. The PET measurement data 111 can represent anything imaged in the scanner's field-of-view (FOV) containing positron emitting isotopes. For example, the PET measurement data 111 can represent whole-body image scans, such as image scans from a patient's head to thigh. Further, image scanning system can transmit the PET measurement data 111 to image reconstruction system 104 (e.g., over one or more wired or wireless communication busses).

In some examples, image scanning system 102 may additionally generate attenuation maps 105 (e.g., µ-maps). For instance, the attenuation map 105 may be based on a separate scan of the patient without receiving radiotracer injections. In other examples, the image scanning system 102 may be a PET/CT scanner that, in addition to PET images, can capture CT scans of the patient. The image scanning system 102 may generate the attenuation maps 105 based on the captured CT images, and may transmit the attenuation maps 105 to the image reconstruction system 104. As another example, the image scanning system 102 may be a PET/MR scanner that, in addition to PET images, can capture MR scans of the patient. The image scanning system 102 may generate the attenuation maps 105 based on the captured MR images, and may transmit the attenuation maps 105 to the image reconstruction system 104.

Further, in some examples, all or parts of image reconstruction system 104 are implemented in hardware, such as in one or more field-programmable gate arrays (FPGAs), one or more application-specific integrated circuits (ASICs), one or more state machines, one or more computing devices, digital circuitry, or any other suitable circuitry. In some examples, parts or all of image reconstruction system 104 can be implemented in software as executable instructions such that, when executed by one or more processors, cause the one or more processors to perform respective functions as described herein. The instructions can be stored in a non-transitory, computer-readable storage medium, and can be read and executed by the one or more processors.

FIG. 2, for example, illustrates a computing device 200 that can be employed by the image reconstruction system 104. Computing device 200 can implement one or more of the functions of the image reconstruction system 104 described herein.

Computing device 200 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 207 can store instructions that, when executed by one or more processors 201, cause one or more processors 201 to perform one or more of the functions of image reconstruction system 104, such as one or more of the histo-image generation processes, the multi-view attenuation histo-image generation processes, and/or the machine learning processes described herein.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of computing device 200. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as PET measurement data 111 and/or attenuation maps 105.

Display 206 can display user interface 205. User interfaces 205 can enable user interaction with computing device 200. For example, user interface 205 can be a user interface for an application that allows for the viewing of final image volumes 191. In some examples, a user can interact with user interface 205 by engaging input-output devices 203. In some examples, display 206 can be a touchscreen, where user interface 205 is displayed on the touchscreen.

Transceiver 204 allows for communication with a network, such as a Wi-Fi network, an Ethernet network, a cellular network, or any other suitable communication network. For example, if operating in a cellular network, transceiver 204 is configured to allow communications with the cellular network. Processor(s) 201 is operable to receive data from, or send data to, a network via transceiver 204.

Referring back to FIG. 1, image reconstruction system 104 includes histo-image generation engine 113, multi-view attenuation histo-image generation engine 120, and image volume reconstruction engine 118. One or more of histo-image generation engine 113, multi-view attenuation histo-image generation engine 120, and image volume reconstruction engine 118 may be implemented in hardware (e.g., digital logic), as by one or more processors, such as processor 201, executing instructions, or in any combination thereof.

Histo-image generation engine 113 operates on PET measurement data 111 (e.g., sinogram, list-mode data) to generate histo-images 115. For example, histo-image generation engine 113 may include a histogrammer that generates the histo-images 115 based on the PET measurement data 111. In some instances, histo-image generation engine 113 may apply a back-projection process to the PET measurement data 111 to generate an histo-image 115. For instance, the back-projection process may assign each event of the PET measurement data 111 to an image voxel along a Line-of-Response (LOR) according to corresponding timing information to generate the histo-image 115.

Further, multi-view attenuation histo-image generation engine 120 receives an attenuation map 105 from the image scanning system 102, and generates multi-view attenuation images 123 (e.g., attenuation histo-images) based on the attenuation map 105. The attenuation map 105 may correspond to the PET measurement data 111, for example. Multi-view attenuation histo-image generation engine 120 may include a histogrammer that generates the multi-view attenuation images 123 based on the attenuation map 105. As described herein, the multi-view attenuation images 123 include attenuation correction factors (ACF), and are generated in a same geometry as the corresponding histo-images 115 and have the same view (e.g., axial view). Further, the multi-view attenuation images 123 provide attenuation correction factors for each voxel along an entire line-of-response (LOR) in corresponding views. The number of views of the histo-image 115 and the multi-view attenuation image 123 may be one or more. For example, the number of views of the histo-image 115 and the multi-view attenuation image 123 may be the same (e.g., ten views). In some instances, the number of views of the histo-image 115 and the multi-view attenuation image 123 may be different.

To further illustrate, FIG. 5 illustrates exemplary multi-view attenuation images in various views, where the degree of shading (e.g., light to dark) represents various ACF values. For instance, multi-view attenuation image 502 corresponds to a view at 0 degrees, while multi-view attenuation image 504 corresponds to a view at 36 degrees. Further, multi-view attenuation image 506 corresponds to a view at 72 degrees, multi-view attenuation image 508 corresponds to a view at 108 degrees, and multi-view attenuation image 510 corresponds to a view at 144 degrees. Each of the views also identify a typical patch 501, such as a μ-map patch. In contrast to providing attenuation information as defined by patch 501, as illustrated the multi-view attenuation images 502, 504, 506, 508, 510 provide attenuation correction factors for each of the voxels along an entire line of response.

Referring back to FIG. 1, image volume reconstruction engine 118 receives each histo-image 115 and corresponding multi-view attenuation image 123, and applies one or more trained machine learning processes to the histo-image 115 and corresponding multi-view attenuation image 123 to reconstruct a corresponding final image volume 191. For instance, image volume reconstruction engine 118 may apply neural network 119 to the histo-image 115 and corresponding multi-view attenuation image 123 to generate the final image volume 191. As described herein, applying the trained machine learning processes to the histo-images 115 and the corresponding multi-view attenuation image 123 includes generating features based on the histo-images 115 and the corresponding multi-view attenuation image 123, and inputting the generated features to a trained machine learning model, such as neural network 119. Based on the inputted features, the trained machine learning model outputs the final image volume 191 (e.g., "corrected" PET image). Further, image reconstruction system 104 may provide the final image volume 191 for display and analysis, for example.

To establish the trained machine learning model, the image reconstruction system 104 may obtain, from data repository 150, trained neural network data 153, which includes parameters (e.g., hyperparameters, coefficients, weights, etc.) characterizing the trained machine learning model. For example, the image reconstruction system 104 may configure executable neural network 119 (e.g., executable instructions characterizing neural network 119) based on (e.g., with) the parameters of the trained neural network data 153.

To determine the parameters of the trained machine learning model, the machine learning model is trained. For example, and as described herein, the image reconstruction system 104 may obtain a training set of histo-image data, such as one or more epochs of histo-images, from data repository 150. The image reconstruction system 104 may also obtain a training set of multi-view attenuation images corresponding to the training set of histo-image data, such as one or more epochs of multi-view attenuation images, from data repository 150. Further, image reconstruction system 104 may generate features based on the training set of histo-image data and the training set of multi-view attenuation images, and input the features into an executed untrained machine learning model, such as an untrained neural network 119. Based on the inputted features, the executed untrained machine learning model may generate output image data characterizing a reconstructed image (e.g., a reconstructed PET image).

Further, image reconstruction system 104 may compute a loss value based on the generated output image data. For example, image reconstruction system 104 may compare the generated output image data to ground truth data to compute the loss value. Image reconstruction system 104 may compute the loss value based on any suitable loss function (e.g., loss algorithm), such as any of a mean square error (MSE), mean absolute error (MAE), binary cross-entropy (BCE), Sobel, Laplacian, and Focal binary loss functions. Further, image reconstruction system 104 determines whether the machine learning model is trained based on the computed loss value. For instance, image reconstruction system 104 may determine whether the computed loss value is beyond (e.g., is greater than, is less than, etc.) a corresponding threshold. If the computed loss value is beyond the corresponding threshold, image reconstruction system 104 may determine the machine learning model is trained, and may store parameters characterizing the trained machine learning model as trained neural network data 153 within data repository 150. If the computed loss value is not beyond the corresponding threshold, image reconstruction system 104 may continue to train the machine learning model (e.g., with additional training sets of image data).

In some examples image reconstruction system 104 performs operations to validate the machine learning model based on additional epochs of histo-image data and corresponding multi-view attenuation images. For example, image reconstruction system 104 may input histo-image data (e.g., histo-images 115) and multi-view attenuation images (e.g., multi-view attenuation image 123) to the initially trained and executed machine learning model which, in response, generates output image data. Image reconstruction system 104 may then compute a loss value based on the output image data, and may determine whether the initially trained and executed machine learning model is validated based on the computed loss value.

Once trained and, in some examples, validated, image reconstruction system 104 may employ the machine learning model to reconstruct images. For example, image reconstruction system 104 may receive PET measurement data 111 from image scanning system 102. As described herein, histo-image generation engine 113 may include a histogrammer that generates a histo-image 115 based on the PET measurement data 111. Further, multi-view attenuation histo-image generation engine 120 may receive attenuation maps 105 from the image scanning system 102, and may generate multi-view attenuation images 123 based on the attenuation maps 105. Further, image volume reconstruction engine 118 may apply the trained neural network 119 to the histo-image 115 and the multi-view attenuation images 123 to generate the final image volume 191.

Figure 3:
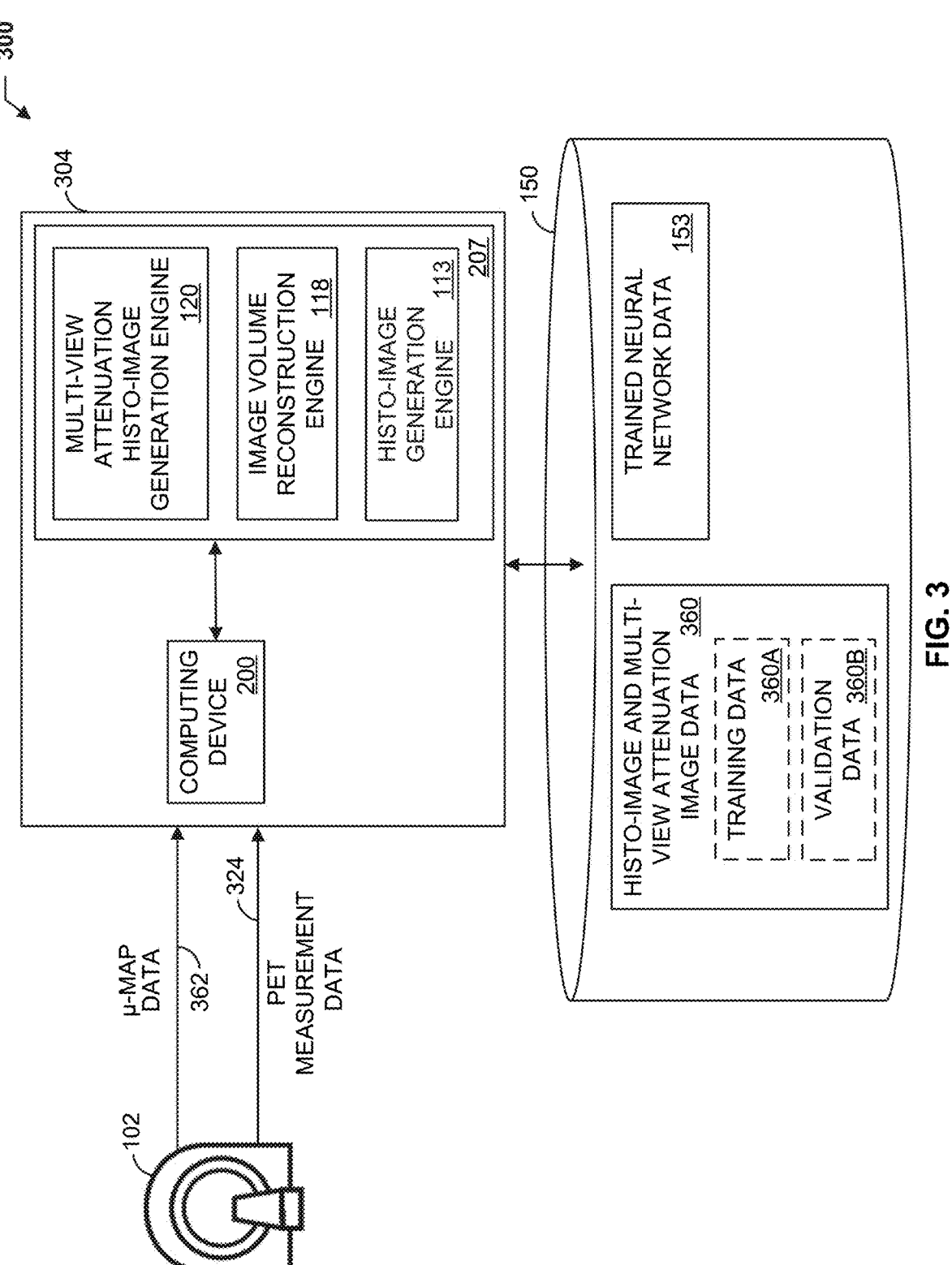
FIG. 3 illustrates a nuclear imaging system that trains machine learning processes, in accordance with some embodiments.

FIG. 3 illustrates an example of a nuclear imaging system 300 for training a machine learning model, such as neural network 119, that when trained can receive input histo-image data and multi-view attenuation images and, based on the input histo-image data and multi-view attenuation images, generate final image volumes, such as the final image volume 191 of FIG. 1. In this example, image reconstruction system 304 includes executable instructions within instruction memory 207 including multi-view attenuation histo-image generation engine 120, histo-image generation engine 113, and image volume reconstruction engine 118. Further, nuclear imaging system 300 includes a computing device 200 communicatively coupled to the instruction memory 207, and that is configured to execute any one or more of the multi-view attenuation histo-image generation engine 120, histo-image generation engine 113, and image volume reconstruction engine 118.

As illustrated, image reconstruction system 304 is communicatively coupled to data repository 150 and to image scanning system 102. Data repository 150 may store histo-image and multi-view attenuation histo-image data 360, which may include training data 360A and/or validation data 360B, for instance. Training data 360A may include epochs of histo-images and multi-view attenuation histo-images to be used for training a machine learning model, such as neural network 119. For example, the histo-images of training data 360A may be generated by executed histo-image generation engine 113 based on PET measurement data 324 received from image scanning system 102. In addition, the multi-view attenuation histo-images may be generated by executed multi-view attenuation histo-image generation engine 120 based on μ-map data 362 received from image scanning system 102. Validation data 360B may include epochs of histo-images and multi-view attenuation histo-images to be used for validating (e.g., testing) an initially trained machine learning model. In some examples, training data 360A and validation data 360B include distinct epochs of histo-images and multi-view attenuation histo-images.

As described herein, executed image volume reconstruction engine 118 may apply a trained machine learning process, such as a trained machine learning process based on a neural network, to histo-images and corresponding multi-view attenuation histo-images to generate a final image volume. To train a machine learning model of the machine learning process of executed image volume reconstruction engine 118, such as neural network 119, computing device 200 may generate features based on the training data 360A. Further, the computing device 200 may input the features to an untrained machine learning model that, in response, generates output image data. Further, may compute a loss value based on the output image data and, for example, corresponding ground truth data (e.g., supervised learning).

Based on the computed loss value, the computing device 200 may determine whether the machine learning model is trained. For instance, the computing device 200 may compare the loss value to a corresponding threshold value to determine if the loss value is beyond (e.g., greater than) the corresponding threshold value. If the loss value is beyond the corresponding threshold value, the computing device 200 may determine the machine learning model is trained, and may store parameters associated with the now trained machine learning model as trained neural network data 153 within data repository 150. Otherwise, if the loss value is not beyond the corresponding threshold value, the computing device 100 may perform operations to continue training the machine learning model.

In some instances, once the machine learning model is trained, the computing device 200 may perform operations to validate the initially trained machine learning model. For example, computing device 200 may obtain validation data 360B from the data repository 150, and may generate features based on the validation data 360B. Further, computing device 200 may input the generated validation features to the initially trained machine learning model and, in response to the inputted validation features, generates additional output image data. Further, computing device 200 may then compute an additional loss value based on the additional output image data and, for instance, corresponding ground truth data.

Based on the computed additional loss value, the computing device 200 may determine whether the machine learning model is validated. For instance, the computing device 200 may compare the additional loss value to a corresponding threshold value to determine if the additional loss value is beyond the corresponding threshold value. If the additional loss value is beyond the corresponding threshold value, the computing device 200 may determine the machine learning model is trained and validated, and may store parameters associated with the now trained and validated machine learning model as trained neural network data 153 within data repository 150. Otherwise, if the additional loss value is not beyond the corresponding threshold value, the computing device 200 may perform operations to continue training, and validating, the machine learning model.

Once trained, image reconstruction system 304 may apply the trained machine learning model to a histo-image generated from PET measurement data 324 and to multi-view attenuation histo-images generated from μ-map data 362, such as PET measurement data 324 and μ-map data 362 received from image scanning system 102 in response to scanning a patient. Based on application of the trained machine learning model to the histo-image and the multi-view attenuation histo-images, the executed trained machine learning model may generate final image volumes, such as the final image volume 191 of FIG. 1.

Figure 4:
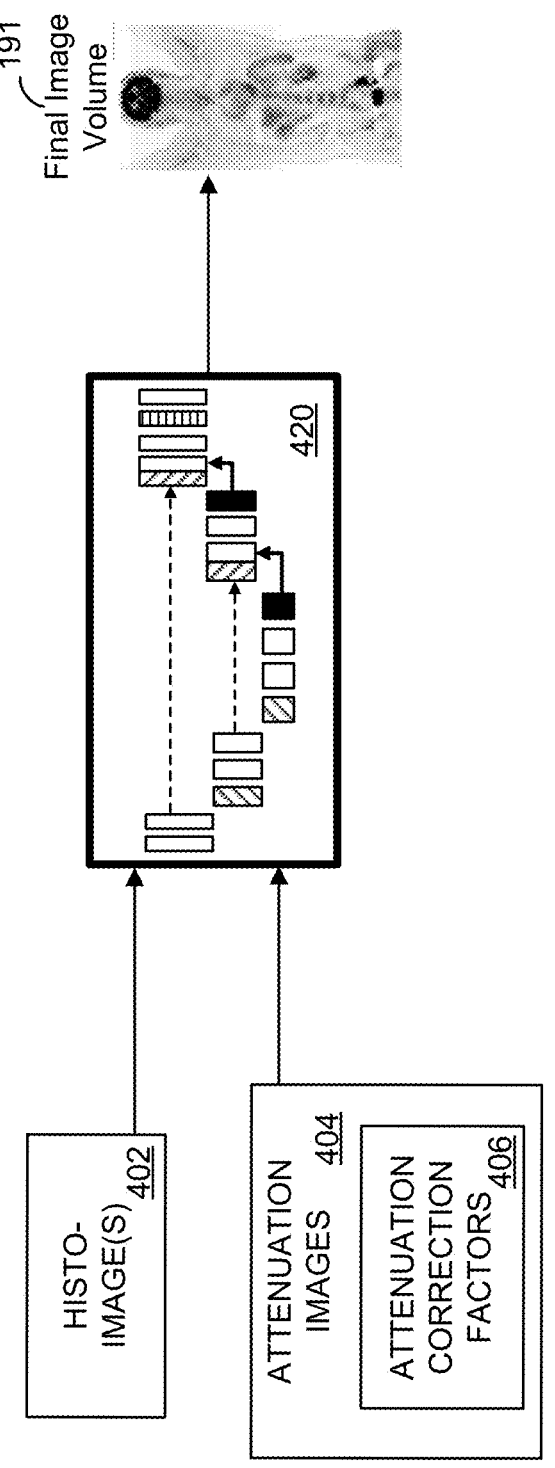
FIG. 4 illustrates a neural network, in accordance with some embodiments.

FIG. 4 illustrates an example of an executable neural network 420, such as neural network 119, that can generate final image volumes, such as the final image volume 191 of FIG. 1. As illustrated, neural network 420 can include various interconnected layers, such as convolutional layers. The neural network 420 can receive histo-images 402 and multi-view attenuation images 404 from, for example, a data repository, such as data repository 150. As described herein, the multi-view attenuation images 404 may include attenuation correction factors 406 characterizing attenuation corrections along a Line-of-Response (LOR) of the histo-image 402. The executed neural network 420 may generate final image volume 191 based on the received histo-image 402 and multi-view attenuation image 404. For instance, an output layer of the executable neural network 420 may output the final image volume 191.

Figure 6A:
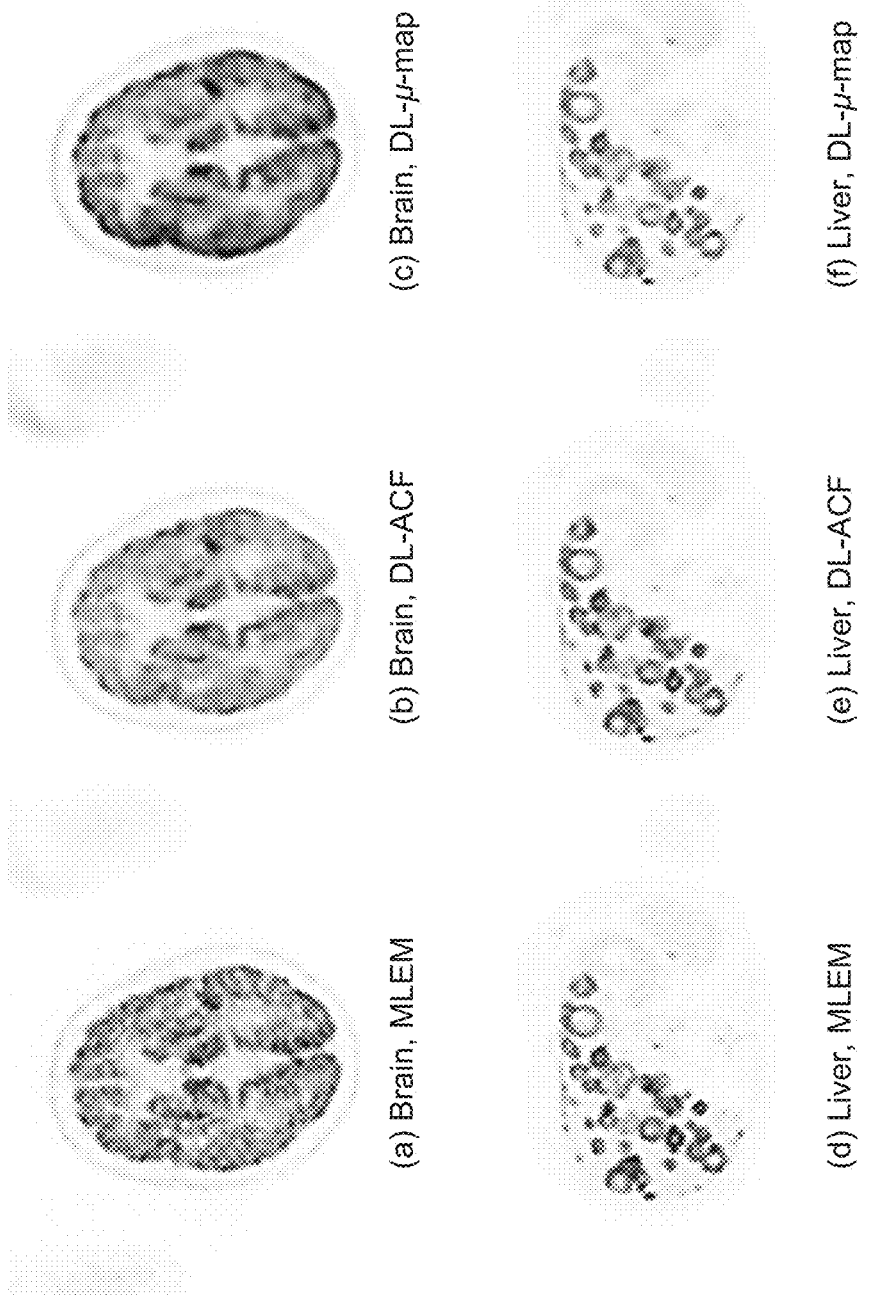
FIG. 6A illustrates a comparison of images reconstructed in accordance with some embodiments and prior art methods.

FIG. 6A illustrates reconstructed PET images using conventional methods and one or more of the methods described herein. For instance, image (a) is an image of a subject brain that was reconstructed based on inputting PET data into a conventional Maximum Likelihood Expectation Maximization (MLEM) model that is being used as a benchmark model. Image (c) is an image of the same brain that was reconstructed based on inputting a multi-view PET data histo-image and a μ-map into a conventional deep learning model. Further, image (b) is an image of the same brain that was reconstructed based on inputting the multi-view PET data histo-image and corresponding multi-view attenuation histo-image into a deep learning model configured to receive histo-images and corresponding multi-view attenuation histo-image, such as the neural network 119 described herein. Specifically, the multi-view PET data histo-image was provided as ten channels, and the multi-view attenuation histo-image with ACF were provided as ten additional channels, to the deep learning model. The multi-view attenuation histo-image corresponds to the same views and have the same geometry as the multi-view PET data histo-image. As illustrated, in image (c), the brain presents some artifacts, especially a darker region on the left side. Further, for image (b), the μ-map patch doesn't carry as much attenuation information to correctly correct for attenuation as does the multi-view attenuation histo-image. Images (a), (b), and (c) were generated using the same color scale.

Further, image (d) is an image of a liver that was reconstructed based on inputting PET data into the conventional MLEM model that is being used as the benchmark model. Image (f) is an image of the same liver that was reconstructed based on inputting a multi-view PET data histo-image and a μ-map into the conventional deep learning model. Further, image (d) is an image of the same liver that was reconstructed based on inputting the multi-view PET data histo-image and corresponding multi-view attenuation histo-image into the deep learning model configured to receive histo-images and corresponding multi-view attenuation histo-images. In these images, image (f) is lighter than the reference image (d), showing that the quantification is off. This is true even though the same color scale was used for images (d), (e), and (f).

Figure 6C:
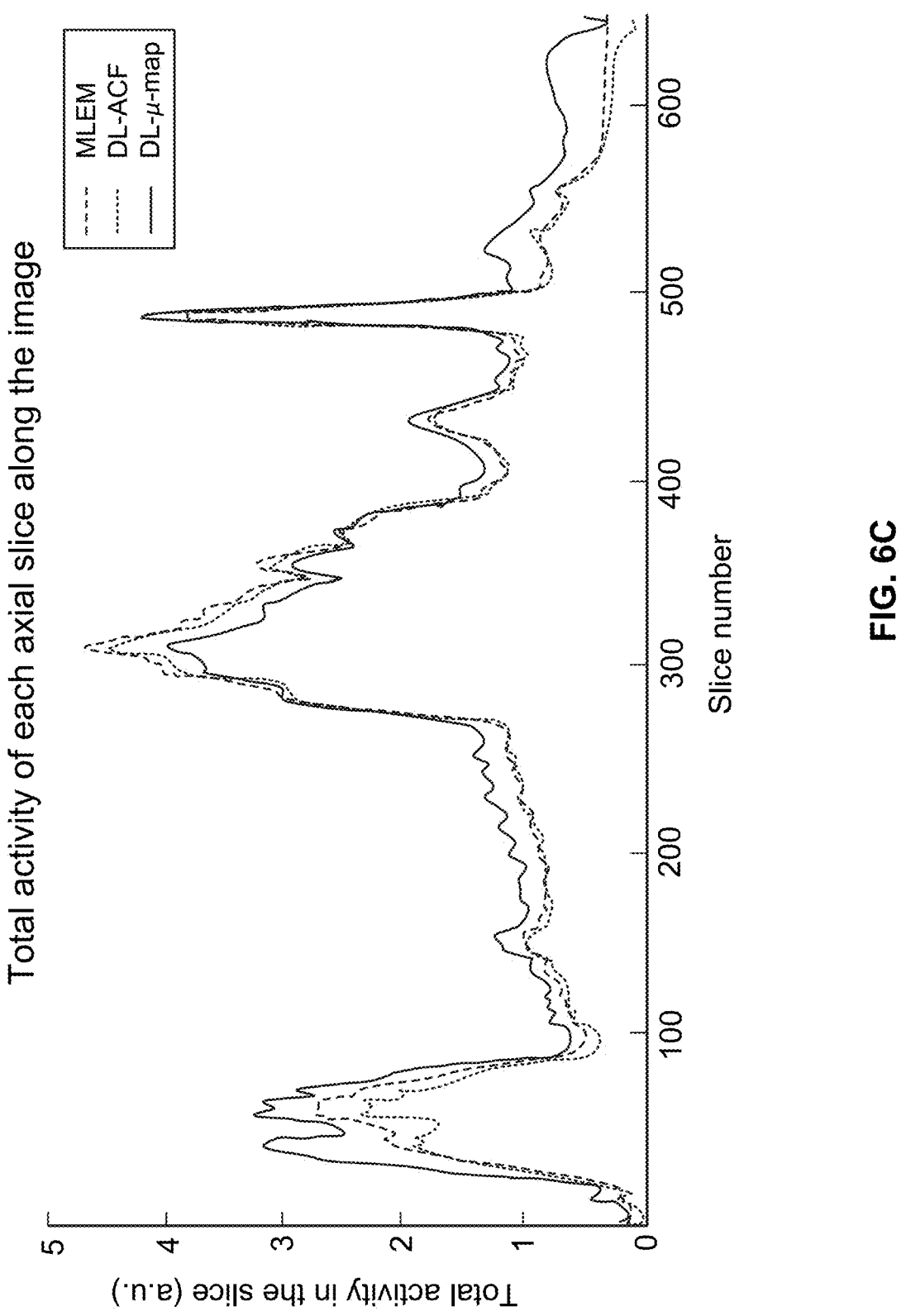
FIG. 6C is a chart illustrating total activity per slice number for the embodiments and prior art methods of FIG. 6A.

FIG. 6B illustrates a table with mean activity detected within images reconstructed using the three methods of FIG. 6A, i.e., the benchmark MLEM model, the conventional deep learning model, and the deep learning model configured to receive histo-images and corresponding multi-view attenuation images. As indicated, the deep learning model configured to receive histo-images and corresponding multi-view attenuation images tracks much closer to the benchmark MLEM model that does the conventional deep learning model. Indeed, as illustrated in the graph of FIG. 6C, the total activity of each axial slice along the images generated by the benchmark MLEM model and the deep learning model configured to receive histo-images and corresponding multi-view attenuation images track much closer than the total activity of each axial slice along the images generated by the benchmark MLEM model and the conventional deep learning model.

FIG. 7 is a flowchart of an example method 700 to reconstruct an image, such as a PET image. The method can be performed by one or more computing devices, such as computing device 200, executing corresponding instructions.

Beginning at block 702, image measurement data is received. For example, computing device 200 may receive PET measurement data 111 from image scanning system 102. At block 704, a histo-image is generated based on the image measurement data. For example, and as described herein, computing device 200 may execute histo-image generation engine 113 to implement a histogrammer that generates histo-images based on PET measurement data 111.

Further, at block 706, attenuation data associated with the image measurement data is received. For instance, as described herein, computing device 200 may receive attenuation maps 105 from the image scanning system 102. The attenuation maps 105 may correspond to the received PET measurement data 111. At block 708, a multi-view attenuation histo-image is generated based on the attenuation map. For example, as described herein, computing device 200 may execute multi-view attenuation histo-image generation engine 120 to implement a histogrammer that generates multi-view attenuation histo-images based on received attenuation maps 105.

Proceeding to block 710, a trained machine learning process is applied to the histo-image and the multi-view attenuation histo-image. For instance, computing device 200 may apply a trained neural network 119 to histo-image 115 and a corresponding multi-view attenuation image 123. At block 712, and based on the application of the trained machine learning process to the histo-image and the multi-view attenuation histo-image, output image data is generated. The output image data characterizes an image volume, such as final image volume 191.

Figure 8:
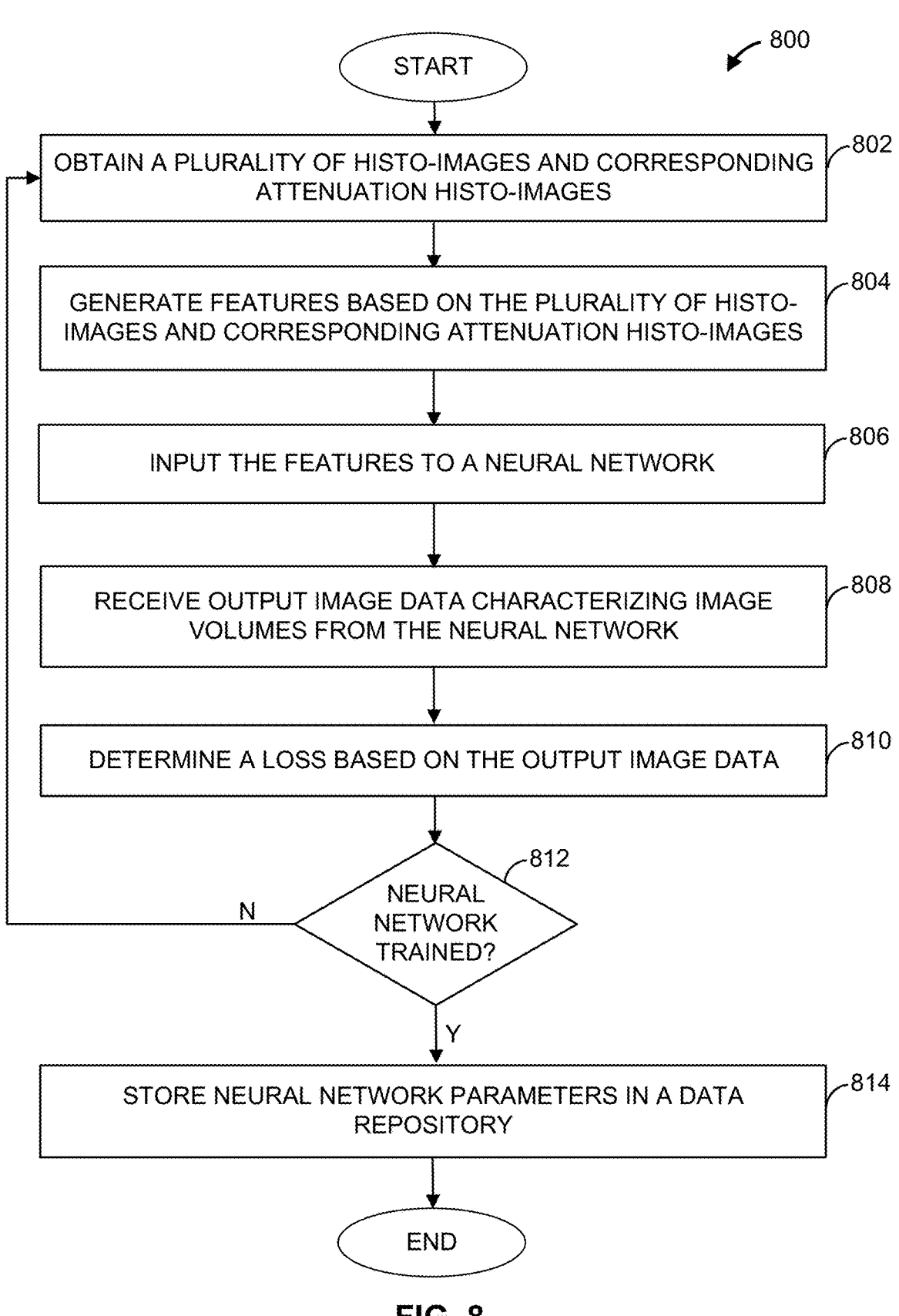
FIG. 8 is a flowchart of an example method to train a neural network based on histo-images and attenuation histo-images, in accordance with some embodiments.

FIG. 8 is a flowchart of an example method 800 to train a neural network based on histo-images and multi-view attenuation histo-images. The method can be performed by one or more computing devices, such as computing device 200, executing corresponding instructions.

Beginning at block 802, a plurality of histo-images and corresponding multi-view attenuation histo-images are obtained. For example, computing device 200 may obtain training data 360A from data repository 150. As described herein, training data 360A may include epochs of histo-images and multi-view attenuation histo-images. At block 804, computing device 200 generates features based on the plurality of histo-images and corresponding multi-view attenuation histo-images.

Further, at block 806, the features are input into an untrained neural network, such as an untrained neural network 119. Based on inputting the features into the untrained neural network, at block 808, output image data is received from the neural network. The output data characterizes image volumes, such as final image volume 191. At block 810, computing device 200 determines a loss based on the output image data. For example, computing device 200 may apply a loss function to values of the output image data and ground truth data to generate a loss value. The loss value may be computed based on any suitable loss function, such as a mean square error (MSE), mean absolute error (MAE), binary cross-entropy (BCE), Sobel, Laplacian, and Focal binary loss functions.

Proceeding to block 812, the computing device 200 determines if the neural network is trained based on the computed loss. For example, computing device 200 may compare the determined loss to a corresponding threshold. If the computed loss is not beyond (e.g., is less than, is greater than) the corresponding threshold, the method proceeds back to block 802 to continue training the neural network. If, however, the computed loss is beyond the corresponding threshold, the method proceeds to block 814. At block 814, the computing device 200 stores neural network parameters associated with the now trained neural network in a data repository. For example, computing device 200 may store the parameters of trained neural network 119 within trained neural network data 153 of data repository 150. As described herein, the trained neural network may be established based on the stored parameters. Once established, the trained neural network may be employed to reconstruct images, such as PET images.

The following is a list of non-limiting illustrative embodiments disclosed herein:

Illustrative Embodiment 1: A computer-implemented method comprising:

receiving image measurement data;

generating a histo-image based on the image measurement data;

receiving attenuation data associated with the image measurement data;

generating an attenuation histo-image based on the attenuation data; and applying a machine learning process to the histo-image and the attenuation histo-image and, based on the application of the machine learning process to the histo-image and the attenuation histo-image, generating output image data characterizing an image volume.

Illustrative Embodiment 2: The computer-implemented method of illustrative embodiment 1, further comprising:

generating first features based on the histo-image;

generating second features based on the image measurement data; and applying the machine learning process to the first features and the second features.

Illustrative Embodiment 3: The computer-implemented method of any of illustrative embodiments 1-2, wherein the attenuation histo-image comprises attenuation correction factors for a line of response (LOR) of the histo-image.

Illustrative Embodiment 4: The computer-implemented method of any of illustrative embodiments 1-3, further comprising generating the attenuation histo-image in a same geometry as the histo-image.

Illustrative Embodiment 5: The computer-implemented method of any of illustrative embodiments 1-4, further comprising generating a plurality of attenuation histo-images comprising the attenuation histo-image, the plurality of attenuation histo-images comprising various views of a same subject.

Illustrative Embodiment 6: The computer-implemented method of any of illustrative embodiments 1-5, wherein the image measurement data is positron emission tomography (PET) measurement data.

Illustrative Embodiment 7: The computer-implemented method of any of illustrative embodiments 1-6, wherein the attenuation data comprises a μ-map.

Illustrative Embodiment 8: The computer-implemented method of any of illustrative embodiments 1-7, wherein the image measurement data is received from a positron emission tomography (PET) scanning system.

Illustrative Embodiment 9: The computer-implemented method of any of illustrative embodiments 1-8, further comprising:

obtaining training data comprising training histo-images and corresponding training attenuation histo-images;

generating training features based on the training histo-images and the training attenuation histo-images;

inputting the training features into an untrained machine learning model;

receiving training output data from the untrained machine learning model; and determining the untrained machine learning model is trained based on the training output data, wherein applying the machine learning process to the histo-image and the attenuation histo-image comprises inputting the histo-image and the attenuation histo-image to the trained machine learning model.

Illustrative Embodiment 10: The computer-implemented method of illustrative embodiment 9, further comprising:

determining a loss value based on the training output data;

determining the machine learning process is trained based on the loss value; and storing parameters associated with the machine learning process in a data repository.

Illustrative Embodiment 11: The computer-implemented method of any of illustrative embodiments 1-10, further comprising:

comparing the loss value to a threshold value; and determining the machine learning process is trained based on the comparison.

Illustrative Embodiment 12: The computer-implemented method of any of illustrative embodiments 1-11, wherein the machine learning process is based on a neural network.

Illustrative Embodiment 13: A non-transitory computer readable medium storing instructions that, when executed by at least one processor, cause the at least one processor to perform operations comprising:

receiving image measurement data;

generating a histo-image based on the image measurement data;

receiving attenuation data associated with the image measurement data;

generating an attenuation histo-image based on the attenuation data; and applying a machine learning process to the histo-image and the attenuation histo-image and, based on the application of the machine learning process to the histo-image and the attenuation histo-image, generating output image data characterizing an image volume.

Illustrative Embodiment 14: The non-transitory, computer readable medium of illustrative embodiment 13 storing instructions that, when executed by the at least one processor, further cause the at least one processor to perform operations comprising:

generating first features based on the histo-image;

generating second features based on the image measurement data; and applying the machine learning process to the first features and the second features.

Illustrative Embodiment 15: The non-transitory, computer readable medium of any of illustrative embodiments 13-14, wherein the attenuation histo-image comprises attenuation correction factors for a line of response (LOR) of the histo-image.

Illustrative Embodiment 16: The non-transitory, computer readable medium of any of illustrative embodiments 13-15 storing instructions that, when executed by the at least one processor, further cause the at least one processor to perform operations comprising generating the attenuation histo-image in a same geometry as the histo-image.

Illustrative Embodiment 17: The non-transitory, computer readable medium of any of illustrative embodiments 13-16 storing instructions that, when executed by the at least one processor, further cause the at least one processor to perform operations comprising generating a plurality of attenuation histo-images comprising the attenuation histo-image, the plurality of attenuation histo-images comprising various views of a same subject.

Illustrative Embodiment 18: The non-transitory, computer readable medium of any of illustrative embodiments 13-17, wherein the image measurement data is positron emission tomography (PET) measurement data.

Illustrative Embodiment 19: The non-transitory, computer readable medium of any of illustrative embodiments 13-18, wherein the attenuation data comprises a μ-map.

Illustrative Embodiment 20: The non-transitory, computer readable medium of any of illustrative embodiments 13-19, wherein the image measurement data is received from a positron emission tomography (PET) scanning system.

Illustrative Embodiment 21: The non-transitory, computer readable medium of any of illustrative embodiments 13-20 storing instructions that, when executed by the at least one processor, further cause the at least one processor to perform operations comprising:

obtaining training data comprising training histo-images and corresponding training attenuation histo-images;

generating training features based on the training histo-images and the training attenuation histo-images;

inputting the training features into an untrained machine learning model;

receiving training output data from the untrained machine learning model; and determining the untrained machine learning model is trained based on the training output data, wherein applying the machine learning process to the histo-image and the attenuation histo-image comprises inputting the histo-image and the attenuation histo-image to the trained machine learning model.

Illustrative Embodiment 22: The non-transitory, computer readable medium of illustrative embodiment 21 storing instructions that, when executed by the at least one processor, further cause the at least one processor to perform operations comprising:

determining a loss value based on the training output data;

determining the machine learning process is trained based on the loss value; and storing parameters associated with the machine learning process in a data repository.

Illustrative Embodiment 23: The non-transitory, computer readable medium of any of illustrative embodiments 13-22 storing instructions that, when executed by the at least one processor, further cause the at least one processor to perform operations comprising: comparing the loss value to a threshold value; and determining the machine learning process is trained based on the comparison.

Illustrative Embodiment 24: The non-transitory, computer readable medium of any of illustrative embodiments 13-23, wherein the machine learning process is based on a neural network Illustrative Embodiment 25: A system comprising:

a database; and at least one processor communicatively coupled to the database and configured to:

receive image measurement data;

generate a histo-image based on the image measurement data;

receive attenuation data associated with the image measurement data;

generate an attenuation histo-image based on the attenuation data;

apply a machine learning process to the histo-image and the attenuation histo-image and, based on the application of the machine learning process to the histo-image and the attenuation histo-image, generating output image data characterizing an image volume; and store the output image data in the database.

Illustrative Embodiment 26: The system of illustrative embodiment 25, wherein the at least one processor is configured to:

generate first features based on the histo-image;

generate second features based on the image measurement data; and apply the machine learning process to the first features and the second features.

Illustrative Embodiment 27: The system of any of illustrative embodiments 25-26, wherein the attenuation histo-image comprises attenuation correction factors for a line of response (LOR) of the histo-image.

Illustrative Embodiment 28: The system of any of illustrative embodiments 25-27, wherein the at least one processor is configured to generate the attenuation histo-image in a same geometry as the histo-image.

Illustrative Embodiment 29: The system of any of illustrative embodiments 25-28, wherein the at least one processor is configured to generate a plurality of attenuation histo-images comprising the attenuation histo-image, the plurality of attenuation histo-images comprising various views of a same subject.

Illustrative Embodiment 30: The system of any of illustrative embodiments 25-29, wherein the image measurement data is positron emission tomography (PET) measurement data.

Illustrative Embodiment 31: The system of any of illustrative embodiments 25-30, wherein the attenuation data comprises a μ-map.

Illustrative Embodiment 32: The system of any of illustrative embodiments 25-31, wherein the image measurement data is received from a positron emission tomography (PET) scanning system.

Illustrative Embodiment 33: The system of any of illustrative embodiments 25-32, wherein the at least one processor is configured to:

obtain training data comprising training histo-images and corresponding training attenuation histo-images;

generate training features based on the training histo-images and the training attenuation histo-images;

input the training features into an untrained machine learning model;

receive training output data from the untrained machine learning model; and determine the untrained machine learning model is trained based on the training output data, wherein applying the machine learning process to the histo-image and the attenuation histo-image comprises inputting the histo-image and the attenuation histo-image to the trained machine learning model.

Illustrative Embodiment 34: The system of illustrative embodiment 33, wherein the at least one processor is configured to:

determine a loss value based on the training output data;

determine the machine learning process is trained based on the loss value; and store parameters associated with the machine learning process in a data repository.

Illustrative Embodiment 35: The system of any of illustrative embodiments 25-34, wherein the at least one processor is configured to:

compare the loss value to a threshold value; and determine the machine learning process is trained based on the comparison.

Illustrative Embodiment 36: The system of any of illustrative embodiments 25-35, wherein the machine learning process is based on a neural network.

Illustrative Embodiment 33: A system comprising:

a means for receiving image measurement data;

a means for generating a histo-image based on the image measurement data;

a means for receiving attenuation data associated with the image measurement data;

a means for generating an attenuation histo-image based on the attenuation data; and a means for applying a machine learning process to the histo-image and the attenuation histo-image and, based on the application of the machine learning process to the histo-image and the attenuation histo-image, generating output image data characterizing an image volume.

Illustrative Embodiment 34: The system of illustrative embodiment 33, further comprising:

a means for generating first features based on the histo-image;

a means for generating second features based on the image measurement data; and a means for applying the machine learning process to the first features and the second features.

Illustrative Embodiment 35: The system of any of illustrative embodiments 33-34, wherein the attenuation histo-image comprises attenuation correction factors for a line of response (LOR) of the histo-image.

Illustrative Embodiment 36: The system of any of illustrative embodiments 33-35, further comprising a means for generating the attenuation histo-image in a same geometry as the histo-image.

Illustrative Embodiment 37: The system of any of illustrative embodiments 33-36, further comprising a means for generating a plurality of attenuation histo-images comprising the attenuation histo-image, the plurality of attenuation histo-images comprising various views of a same subject.

Illustrative Embodiment 38: The system of any of illustrative embodiments 33-37, wherein the image measurement data is positron emission tomography (PET) measurement data.

Illustrative Embodiment 39: The system of any of illustrative embodiments 33-38, wherein the attenuation data comprises a μ-map.

Illustrative Embodiment 40: The system of any of illustrative embodiments 33-39, wherein the image measurement data is received from a positron emission tomography (PET) scanning system.

Illustrative Embodiment 41: The system of any of illustrative embodiments 33-40, further comprising:

a means for obtaining training data comprising training histo-images and corresponding training attenuation histo-images;

a means for generating training features based on the training histo-images and the training attenuation histo-images;

a means for inputting the training features into an untrained machine learning model;

a means for receiving training output data from the untrained machine learning model; and a means for determining the untrained machine learning model is trained based on the training output data, wherein applying the machine learning process to the histo-image and the attenuation histo-image comprises inputting the histo-image and the attenuation histo-image to the trained machine learning model.

Illustrative Embodiment 42: The system of illustrative embodiment 41, further comprising:

a means for determining a loss value based on the training output data;

a means for determining the machine learning process is trained based on the loss value; and a means for storing parameters associated with the machine learning process in a data repository.

Illustrative Embodiment 43: The system of any of illustrative embodiments 33-42, further comprising:

a means for comparing the loss value to a threshold value; and a means for determining the machine learning process is trained based on the comparison.

Illustrative Embodiment 44: The system of any of illustrative embodiments 33-43, wherein the machine learning process is based on a neural network.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method comprising:

receiving image measurement data;

generating a first histo-image based on the image measurement data;

receiving attenuation data associated with the image measurement data;

generating an attenuation histo-image based on the attenuation data;

applying a machine learning process to the first histo-image and the attenuation histo-image and, based on the application of the machine learning process to the first histo-image and the attenuation histo-image, generating output image data characterizing an image volume;

obtaining training data comprising training histo-images and corresponding training attenuation histo-images;

generating training features based on the training histo-images and the training attenuation histo-images;

inputting the training features into an untrained machine learning model;

receiving training output data from the untrained machine learning model; and determining the untrained machine learning model is trained based on the training output data, wherein applying the machine learning process to the first histo-image and the attenuation histo-image comprises inputting the first histo-image and the attenuation histo-image to the trained machine learning model.

2. The computer-implemented method of claim 1, further comprising:

generating first features based on the first histo-image;

generating second features based on the image measurement data; and applying the machine learning process to the first features and the second features.

3. The computer-implemented method of claim 1, wherein the attenuation histo-image comprises attenuation correction factors for a line of response (LOR) of the first histo-image.

4. The computer-implemented method of claim 1, further comprising generating the attenuation histo-image in a same geometry as the first histo-image.

5. The computer-implemented method of claim 1, further comprising generating a plurality of attenuation histo-images comprising the attenuation histo-image, the plurality of attenuation histo-images comprising various views of a same subject.

6. The computer-implemented method of claim 1, wherein the image measurement data is positron emission tomography (PET) measurement data.

7. The computer-implemented method of claim 1, wherein the attenuation data comprises a u-map.

8. The computer-implemented method of claim 1, wherein the image measurement data is received from a positron emission tomography (PET) scanning system.

9. The computer-implemented method of claim 1, further comprising:

determining a loss value based on the training output data;

determining the machine learning process is trained based on the loss value; and storing parameters associated with the machine learning process in a data repository.

10. The computer-implemented method of claim 9, further comprising:

comparing the loss value to a threshold value; and determining the machine learning process is trained based on the comparison.

11. The computer-implemented method of claim 1, wherein the machine learning process is based on a neural network.

12. A non-transitory computer readable medium storing instructions that, when executed by at least one processor, cause the at least one processor to perform operations comprising:

receiving image measurement data;

generating a first histo-image based on the image measurement data;

receiving attenuation data associated with the image measurement data;

generating an attenuation histo-image based on the attenuation data;

applying a machine learning process to the first histo-image and the attenuation histo-image and, based on the application of the machine learning process to the first histo-image and the attenuation histo-image, generating output image data characterizing an image volume;

obtaining training data comprising training histo-images and corresponding training attenuation histo-images;

generating training features based on the training histo-images and the training attenuation histo-images;

inputting the training features into an untrained machine learning model;

receiving training output data from the untrained machine learning model; and determining the untrained machine learning model is trained based on the training output data, wherein applying the machine learning process to the first histo-image and the attenuation histo-image comprises inputting the first histo-image and the attenuation histo-image to the trained machine learning model.

13. The non-transitory computer readable medium of claim 12 storing instructions that, when executed by at least one processor, further cause the at least one processor to perform operations comprising:

generating first features based on the first histo-image;

generating second features based on the image measurement data; and applying the machine learning process to the first features and the second features.

14. The non-transitory computer readable medium of claim 12, wherein the non-transitory computer readable medium storing instructions that, when executed by at least one processor, further cause the at least one processor to perform operations comprising generating the attenuation histo-image in a same geometry as the first histo-image.

15. The non-transitory computer readable medium of claim 12, wherein the non-transitory computer readable medium storing instructions that, when executed by at least one processor, further cause the at least one processor to perform operations comprising generating a plurality of attenuation histo-images comprising the attenuation histo-image, the plurality of attenuation histo-images comprising various views of a same subject.

16. The non-transitory computer readable medium of claim 12 storing instructions that, when executed by at least one processor, further cause the at least one processor to perform operations comprising:

determining a loss value based on the training output data;

determining the machine learning process is trained based on the loss value; and storing parameters associated with the machine learning process in a data repository.

17. The non-transitory computer readable medium of claim 16 storing instructions that, when executed by at least one processor, further cause the at least one processor to perform operations comprising:

comparing the loss value to a threshold value; and determining the machine learning process is trained based on the comparison.

18. A system comprising:

a database; and at least one processor communicatively coupled to the database and configured to:

receive image measurement data;

generate a first histo-image based on the image measurement data;

receive attenuation data associated with the image measurement data;

generate an attenuation histo-image based on the attenuation data;

apply a machine learning process to the first histo-image and the attenuation histo-image and, based on the application of the machine learning process to the first histo-image and the attenuation histo-image, generating output image data characterizing an image volume;

store the output image data in the database;

obtain training data comprising training histo-images and corresponding training attenuation histo-images;

generating training features based on the training histo-images and the training attenuation histo-images;

input the training features into an untrained machine learning model;

receive training output data from the untrained machine learning model; and determine the untrained machine learning model is trained based on the training output data, wherein applying the machine learning process to the first histo-image and the attenuation histo-image comprises inputting the first histo-image and the attenuation histo-image to the trained machine learning model.

\* \* \* \* \*